United States Patent
Ohgami et al.

(10) Patent No.: US 9,373,855 B2
(45) Date of Patent: Jun. 21, 2016

(54) FUEL CELL SYSTEM

(71) Applicant: HONDA MOTOR CO., LTD., Tokyo (JP)

(72) Inventors: Osamu Ohgami, Saitama (JP); Koichiro Miyata, Saitama (JP); Yusai Yoshimura, Saitama (JP)

(73) Assignee: HONDA MOTOR CO., LTD., Tokyo (JP)

( * ) Notice: Subject to any disclaimer, the term of this patent is extended or adjusted under 35 U.S.C. 154(b) by 267 days.

(21) Appl. No.: 14/087,495

(22) Filed: Nov. 22, 2013

(65) Prior Publication Data

US 2014/0147760 A1 May 29, 2014

(30) Foreign Application Priority Data

Nov. 27, 2012 (JP) ................. 2012-258887

(51) Int. Cl.
*H01M 8/04089* (2016.01)
*H01M 8/04* (2016.01)
*B60L 11/18* (2006.01)

(52) U.S. Cl.
CPC ....... *H01M 8/04097* (2013.01); *B60L 11/1898* (2013.01); *H01M 8/04753* (2013.01); *H01M 8/04201* (2013.01); *H01M 2250/20* (2013.01); *Y02E 60/50* (2013.01); *Y02T 90/32* (2013.01); *Y02T 90/34* (2013.01)

(58) Field of Classification Search
None
See application file for complete search history.

(56) References Cited

U.S. PATENT DOCUMENTS

2010/0151284 A1* 6/2010 Burch ............... H01M 8/04014
429/444

FOREIGN PATENT DOCUMENTS

| JP | 2002-151116 A | 5/2002 |
| JP | 2005-302571 A | 10/2005 |
| JP | 2007-165186 A | 6/2007 |

OTHER PUBLICATIONS

Yorito (JP, 2002-151116) (a raw machine translation) (Abstract, Detailed Description and Drawings) (May 24, 2002).*

* cited by examiner

*Primary Examiner* — Patrick Ryan
*Assistant Examiner* — Carmen Lyles-Irving
(74) *Attorney, Agent, or Firm* — Squire Patton Boggs (US) LLP

(57) ABSTRACT

Provided is a fuel-cell system having a control device which controls driving of a first fuel supply device and a second fuel supply device. The control device includes, a driving-interval setting unit which sets first driving intervals for the first fuel supply device and second driving intervals for the second fuel supply device, a first fuel-supply-device control unit which sets valve-open durations of the first fuel supply device according to the first driving intervals, and a second fuel-supply-device control unit which sets valve-open durations of the second fuel supply device according to the second driving intervals. The driving-interval setting unit sets the second driving intervals to be shorter than the first driving intervals.

5 Claims, 8 Drawing Sheets

FIG.3

| Periodic Signal | Periodic Signals A and B | Periodic Signal B Only |
|---|---|---|
| Load-based Hydrogen Amount | INJ A | Not Assigned |
| Pressure-control Hydrogen Amount | ·Predetermined Value or Less →INJ A<br>·Above Predetermined Value → {INJ A(50%)<br>INJ B(50%)} | ·Threshold Value or Less →Not Assigned<br>·Above Threshold Value →INJ B |
| Exhausted Hydrogen Amount | INJ B | INJ B |

FIG.8

| Periodic Signal | Periodic Signal A | Periodic Signal B |
|---|---|---|
| Load-based Hydrogen Amount | INJ A | Not Assigned |
| Pressure-control Hydrogen Amount | ·Below Threshold Value→INJ A<br>·Threshold Value or More→Not Assigned | ·Below Threshold Value→Not Assigned<br>·Threshold Value or More→INJ B |
| Exhausted Hydrogen Amount | Not Assigned | INJ B |

FUEL CELL SYSTEM

BACKGROUND OF THE INVENTION

1. Field of the Invention

The present invention relates to a fuel-cell system.

2. Description of the Related Art

For example, Japanese Patent Laid-open No. 2007-165186 discloses a fuel-cell system in which a period (called a driving interval) as a sum of a valve-open duration and a valve-closed duration of an injector can be changed to be lengthened or shortened according to the load on the fuel cell.

Generally, in the fuel-cell systems, in some cases, a rapid change in the load or opening of a purge valve can cause a variation in the anode pressure during a driving interval of the injector. In addition, in the conventional fuel-cell systems, it is necessary to wait for the next driving interval before opening a purge valve for controlling the anode pressure. Therefore, in the conventional fuel-cell systems, it is impossible to quickly control the anode pressure even when the anode pressure rapidly varies, so that stoichiometric insufficiency can occur in the fuel cell.

In view of above, the object of the present invention is to provide a fuel-cell system which is excellent in pressure controllability, and can quickly control the anode pressure even when the anode pressure rapidly varies.

SUMMARY OF THE INVENTION

In order to achieve the above object, a fuel-cell system according to the present invention is provided. The fuel-cell system according to the present invention includes: a fuel cell which is supplied with fuel gas and oxidant gas to generate electric power; fuel-gas supply piping which connects the fuel cell and a fuel tank; fuel-off-gas exhaust piping into which fuel off-gas exhausted from the fuel cell flows; fuel-gas circulation piping which connects the fuel-off-gas exhaust piping and the fuel-gas supply piping; a first fuel supply device which is arranged in the fuel-gas supply piping on an upstream side of a connection between the fuel-gas supply piping and the fuel-gas circulation piping; bypass piping which branches off from the fuel-gas supply piping, forms a bypass of the first fuel supply device and the connection, and joins the fuel-gas supply piping; a second fuel supply device arranged in the bypass piping; and a control device which controls driving of the first fuel supply device and the second fuel supply device. The control device includes, a driving-interval setting unit which sets first driving intervals for the first fuel supply device and second driving intervals for the second fuel supply device, a first fuel-supply-device control unit which sets valve-open durations of the first fuel supply device according to the first driving intervals, and a second fuel-supply-device control unit which sets valve-open durations of the second fuel supply device according to the second driving intervals. The driving-interval setting unit sets the second driving intervals to be shorter than the first driving intervals.

According to the present invention, the second driving intervals for the second fuel supply device are set shorter than the first driving intervals for the first fuel supply device. Therefore, it is possible to control the anode pressure by opening a valve in the second fuel supply device without waiting for the next one of the first driving intervals even when the anode pressure rapidly varies. Thus, according to the present invention, it is possible to quickly control the anode pressure even when the anode pressure rapidly varies during one of the first driving intervals, and therefore reduce the possibility of occurrence of stoichiometric insufficiency in the fuel cell.

In addition, preferably, the fuel-cell system according to the present invention further includes an exhaust valve in the fuel-off-gas exhaust piping, the control device further includes an exhaust-gas-amount calculation unit which calculates an amount of the exhausted fuel off-gas on the basis of a valve-open duration of the exhaust valve, and the control device sets the valve-open durations of the second fuel supply device on the basis of the amount of the exhausted fuel off-gas.

In the case where the fuel-cell system according to the present invention is configured as above, when the fuel gas is exhausted by opening the exhaust valve, the valve in the second fuel supply device is opened. In addition, the valve-open duration of the second fuel supply device is set on the basis of the amount of the exhausted fuel off-gas. Therefore, even when the opening of the exhaust valve causes a great pressure change during one of the first driving intervals, the anode pressure can be controlled by opening the valve in the second fuel supply device. Thus, it is possible to avoid occurrence of stoichiometric insufficiency and stabilize the power generation in the fuel cell.

Further, preferably, the fuel-cell system according to the present invention further includes a circulation device in the connection between the fuel-gas supply piping and the fuel-gas circulation piping, and the control device preferentially assigns to the first fuel supply device a load-based hydrogen amount of the fuel gas corresponding to a load on the fuel cell, and assigns to the second fuel supply device an excess of the load-based hydrogen amount over a capacity of the first fuel supply device.

In the case where the fuel-cell system according to the present invention is configured as above, the circulation device is arranged in the connection, which is arranged on the downstream side of the first fuel supply device. Therefore, it is possible to improve the capacity of circulation of the fuel gas which is injected by the first fuel supply device.

In addition, the control device preferentially assigns the load-based hydrogen amount of the fuel gas to the first fuel supply device, which has a high circulation capacity. Therefore, the stability of the power generation by the fuel cell can be improved, compared with the case where the fuel gas is supplied by the second fuel supply device.

Furthermore, preferably, the driving-interval setting unit sets the first driving intervals such as to be gradually lengthened as a load imposed on the fuel cell decreases.

In the case where the fuel-cell system according to the present invention is configured as above, the first driving intervals are set to be gradually lengthened in the range exceeding the second driving intervals as the load imposed on the fuel cell decreases. Therefore, when the load imposed on the fuel cell is light, the intervals between injections from the first fuel supply device become long, allowing the number of operations of driving the first fuel supply device to be reduced. On the other hand, when the load imposed on the fuel cell is heavy, the intervals between injections from the first fuel supply device become short, so that it is possible to relatively quickly supply a necessary amount of hydrogen to the fuel supply cell and increase the lifetime of the fuel cell.

According to the present invention, it is possible to provide a fuel-cell system which is excellent in pressure controllability, and can quickly control the anode pressure even when the anode pressure rapidly varies.

BRIEF DESCRIPTION OF THE DRAWINGS

FIG. 3 is a diagram illustrating an assignment table according to the embodiment;

FIG. 8 is a diagram illustrating an assignment table according to the variation.

DETAILED DESCRIPTION OF THE INVENTION

1. Fuel-Cell System as Embodiment

A fuel-cell system according to an embodiment of the present invention will be explained below with reference to accompanying drawings as needed. The fuel-cell system 1 according to the embodiment is mounted on a fuel-cell vehicle (or car and mobile body), which is driven by a motor 100. The vehicle may be, for example, a four-, three-, two-, single-wheeled vehicle, or a train. The mobile body may be a ship, an airplane, or the like.

Figure 1:
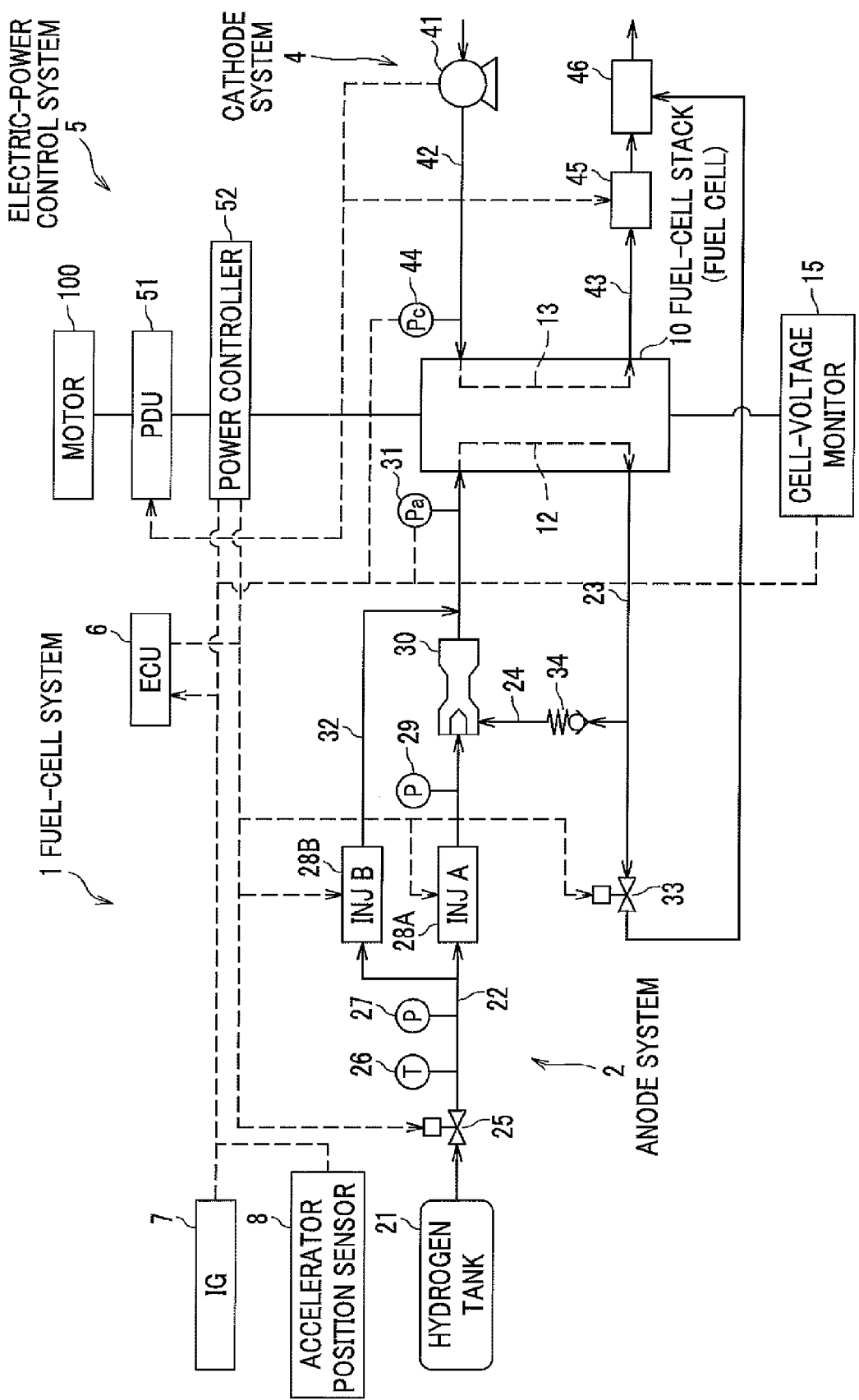
FIG. 1 is a diagram illustrating the main configuration of a fuel-cell system according to an embodiment of the present invention.

As illustrated in FIG. 1, the fuel-cell system 1 includes a fuel-cell stack (or fuel cell) 10, an anode system 2, a cathode system 4, an electric-power control system 5, and an ECU (electronic control unit) 6. The fuel-cell stack 10 generates electric power which is supplied to the motor 100. Note the fuel-cell stack 10 may be hereinafter referred to as the fuel cell 10. The anode system 2 supplies hydrogen (or fuel gas) to the fuel-cell stack 10, and exhausts anode off-gas (or fuel off-gas). The cathode system 4 supplies air containing oxygen (or oxidant gas) to the fuel-cell stack 10, and exhausts cathode off-gas. The electric-power control system 5 controls the power generation of the fuel-cell stack 10. The ECU 6 electronically controls the fuel-cell stack 10, the anode system 2, the cathode system 4, and the electric-power control system 5.

The fuel-cell stack 10 is a stack of unit cells of a solid polymer type which are electrically connected in series. Each of the unit cells is constituted by an MEA (membrane electrode assembly) sandwiched by a pair of conductive separators.

The MEA is constituted by an electrolyte membrane (or solid polymer membrane) made of a monovalent cation exchange membrane sandwiched by an anode and a cathode. Grooves and through-holes are formed in each separator, where the grooves are arranged for supplying hydrogen or air to the entire area of the MEA, and the through-holes are arranged for supplying hydrogen or air to the entire unit cell and exhausting hydrogen or air from the entire unit cell. The above grooves and through-holes realize an anode flow path (or fuel-gas flow path) 12 and a cathode flow path (or oxidant-gas flow path) 13.

A cell-voltage monitor 15 is a device for detecting the cell voltage of each unit cell constituting the fuel-cell stack 10, and can output an average cell voltage and a minimum cell voltage to the ECU 6.

As illustrated in FIG. 1, the anode system 2 is mainly constituted by a hydrogen tank (or fuel tank) 21, hydrogen-supply piping 22, anode-off-gas exhaust piping 23, and hydrogen circulation piping 24. The hydrogen tank 21 is filled with high-pressure hydrogen. The hydrogen-supply piping 22 connects the hydrogen tank 21 to an inlet of the anode flow path 12 in the fuel-cell stack 10. The anode-off-gas exhaust piping 23 connects an outlet of the anode flow path 12 to a diluter 46. The hydrogen circulation piping 24 connects the hydrogen-supply piping 22 to the anode-off-gas exhaust piping 23.

In hydrogen-supply piping 22, a normally closed type shutoff valve 25, a temperature sensor 26, an upstream pressure sensor 27, a first injector 28A, a downstream pressure sensor 29, an ejector 30, and an anode pressure sensor 31 are arranged in this order from upstream to downstream. (Note the first injector 28A is denoted by "INJ A" in the drawings.)

Figure 2:
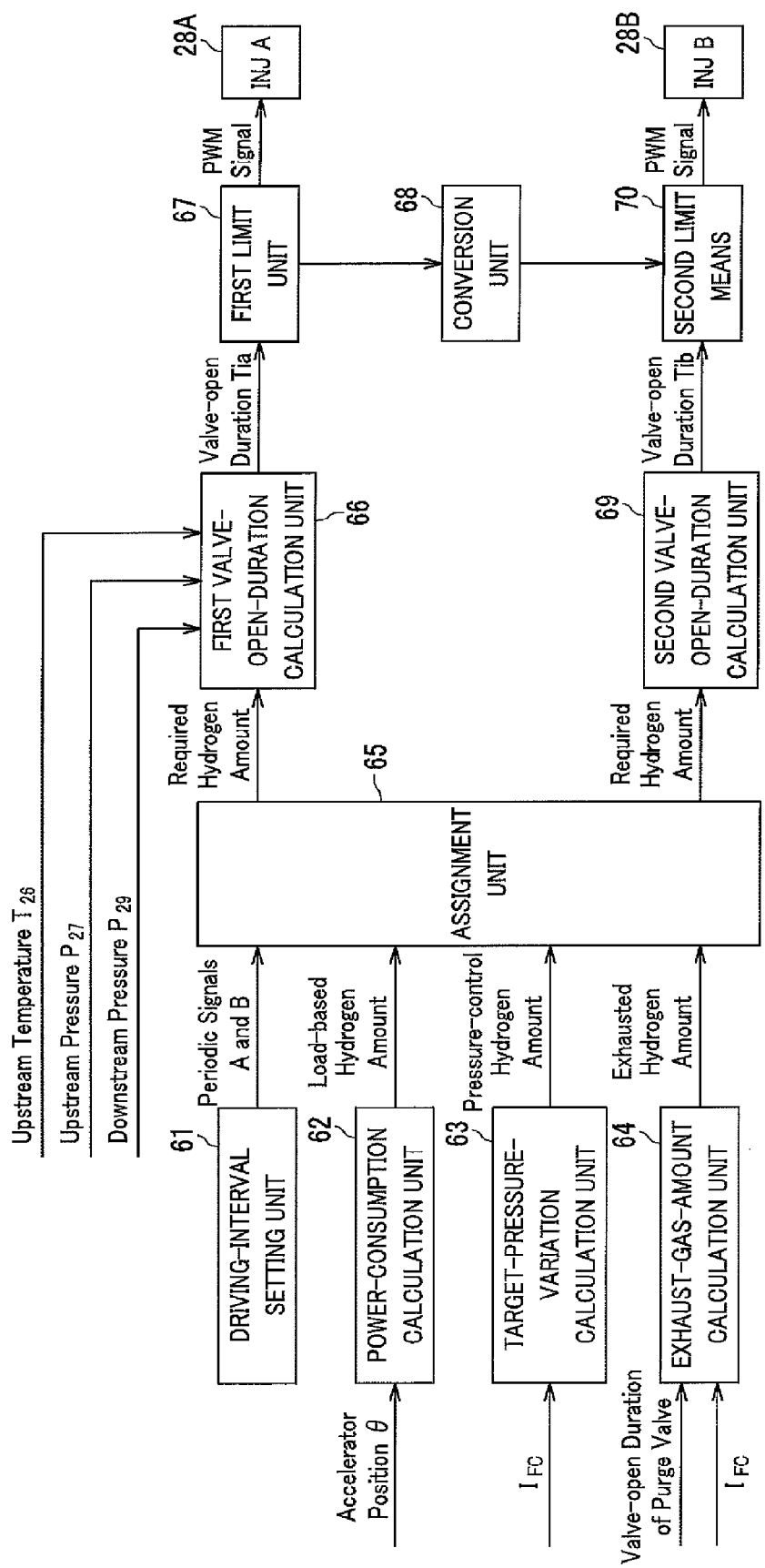
FIG. 2 is a block diagram presented for explaining details of control functions of a control device according to the embodiment.

The shutoff valve 25 is electromagnetically actuated to be opened or closed in accordance with a command from the ECU 6. The temperature sensor 26 and the upstream pressure sensor 27 respectively detect the temperature and pressure of hydrogen on the upstream side of the first injector 28A in order to calculate the ineffective injection time of the first injector 28A. The upstream temperature $T_{26}$ and the upstream pressure $P_{27}$, detected by the temperature sensor 26 and the upstream pressure sensor 27, are outputted to the ECU 6 (as illustrated in FIG. 2).

The first injector 28A is a device which can intermittently inject hydrogen under electronic control by the ECU 6. The first injector 28A corresponds to the "first fuel supply device" described in the SUMMARY OF THE INVENTION.

The downstream pressure sensor 29 detects the pressure on the downstream side of the first injector 28A in order to calculate the difference between the amount of hydrogen which the first injector 28A was instructed to inject and the amount of hydrogen actually injected by the first injector 28A. The downstream pressure $P_{29}$, detected by the downstream pressure sensor 29, is outputted to the ECU 6 (as illustrated in FIG. 2).

The ejector 30 is a circulation device arranged at the connection between the hydrogen-supply piping 22 and the hydrogen circulation piping 24. A nozzle and a diffuser are arranged in the ejector 30. The hydrogen on the upstream side of the hydrogen-supply piping 22 can be ejected through the nozzle in the ejector 30 for generating a negative pressure. In addition, the diffuser in the ejector 30 supplies mixed gas of the hydrogen from the hydrogen-supply piping 22 and the anode off-gas (or fuel off-gas) sucked from the hydrogen circulation piping 24 by the negative pressure, to the hydrogen-supply piping 22 on the downstream side of the ejector 30.

The anode pressure sensor 31 is arranged in a vicinity of the inlet of the anode flow path 12, detects the pressure Pa in the hydrogen-supply piping 22, and outputs the detected values of the pressure Pa to the ECU 6 (as illustrated in FIG. 2). Herein, the pressure Pa in the hydrogen-supply piping 22 is approximately equal to the anode pressure Pa in the anode flow path 12. Alternatively, the anode pressure sensor 31 may be arranged in a vicinity of the outlet of the anode flow path 12 in the anode-off-gas exhaust piping 23 instead of the hydrogen-supply piping 22.

Further, bypass piping 32 is arranged on the hydrogen-supply piping 22. The bypass piping 32 branches off on the upstream side of the first injector 28A, and joins the hydrogen-supply piping 22 on the downstream side of the ejector 30. In addition, a second injector 28B is arranged in the bypass piping 32. Note the second injector 28B may be denoted by "INJ B" in the drawings.

Therefore, even while the first injector 28A is closed, hydrogen in the hydrogen tank 21 can be supplied to the anode flow path 12 through the bypass piping 32 as long as the shutoff valve 25 is open. The second injector 28B corresponds to the "second fuel supply device" described in the SUMMARY OF THE INVENTION.

For example, the first and second injectors 28A and 28B may be of the same type (that is, having the identical capability). Alternatively, one of the first and second injectors 28A and 28B may be a type which can inject hydrogen at a greater flow rate than the other of the first and second injectors 28A and 28B. The first and second injectors 28A and 28B can be changed when necessary.

The anode-off-gas exhaust piping 23 is a pipe arrangement for exhausting the anode off-gas from the fuel-cell stack 10. In addition, a purge valve (or exhaust valve) 33 for exhausting (or purging) impurities (that is, water vapor, nitrogen, and the like) contained in the anode off-gas is arranged in the anode-off-gas exhaust piping 23. Note the purge valve 33 may be denoted by "PG" in the accompanying drawings.

The hydrogen circulation piping 24 is a pipe arrangement for returning to the ejector 30 the anode off-gas (or fuel off-gas) being exhausted from the anode flow path 12 and containing unconsumed hydrogen. In addition, a check valve 34 for preventing reverse flow of the anode off-gas is arranged in the hydrogen circulation piping 24.

The cathode system 4 is constituted by an air pump 41, oxygen-supply piping 42, and cathode-off-gas exhaust piping 43. The oxygen-supply piping 42 connects the air pump 41 to an inlet of the cathode flow path 13 in the fuel-cell stack 10. The cathode-off-gas exhaust piping 43 connects an outlet of the cathode flow path 13 in the fuel-cell stack 10 to the outside of the fuel-cell vehicle.

The air pump 41 is driven by a motor (not shown), and operates in accordance with a command from the ECU 6. The air pump 41 intakes air containing oxygen, and supplies the air to the cathode flow path 13.

The oxygen-supply piping 42 is a pipe arrangement for supplying to the fuel-cell stack 10 oxygen supplied from the air pump 41. A pressure sensor 44 is arranged in a vicinity of the inlet of the cathode flow path 13 in the oxygen-supply piping 42. The pressure sensor 44 detects the cathode pressure Pc in the oxygen-supply piping 42, and outputs the detected value of the cathode pressure Pc to the ECU 6. Herein, the cathode pressure Pc in the oxygen-supply piping 42 is approximately equal to the cathode pressure in the cathode flow path 13.)

The cathode-off-gas exhaust piping 43 is a pipe arrangement for exhausting the cathode off-gas (or oxidant off-gas) from the cathode flow path 13. In addition, a back pressure valve 45 and the diluter 46 are arranged in the cathode-off-gas exhaust piping 43. The diluter 46 is a vessel in which the anode off-gas and the cathode off-gas are mixed and the hydrogen in the anode off-gas is diluted with the cathode off-gas (or dilution gas). The diluter 46 is configured to exhaust the mixed and diluted gas to the outside of the vehicle.

The electric-power control system 5 is mainly constituted by a PDU (Power Drive Unit) 51 and a power controller 52. The PDU 51 is an inverter which converts direct-current power outputted from the power controller 52, into three-phase electric power in accordance with a command from the ECU 6, and supplies the three-phase electric power to the motor 100.

The power controller 52 has a function of controlling the output of the fuel-cell stack 10 (that is, generated power, a current value, and a voltage value) in accordance with a command from the ECU 6. In addition, the power controller 52 is constituted by various electronic circuits including a DC-DC chopper circuit. Further, the power controller 52 is configured to transmit to the ECU 6 the current value of the current $I_{FC}$ outputted from the fuel-cell stack 10.

The IG (ignition switch) 7 is a start switch of the fuel-cell vehicle on which the fuel-cell system 1 is mounted, and is arranged around the driver's seat. The IG 7 is connected to the ECU 6, so that the ECU 6 can detect an ON signal (or a system start signal) and an OFF signal (or a system stop signal) of the IG 7.

The accelerator position sensor 8 is a sensor which detects the accelerator position θ, which indicates the depressed amount of an accelerator pedal (not shown) arranged in the fuel-cell vehicle. The accelerator position sensor 8 outputs the detected accelerator position θ to the ECU 6 (as illustrated in FIG. 2).

The ECU 6 is a control device which electronically controls the fuel-cell system 1, and constituted by a CPU (central processing unit), a ROM (read only memory), a RAM (random access memory), various interfaces, electronic circuits, and other elements. The ECU 6 is configured to execute various processes by controlling the various devices in accordance with programs stored in the ECU 6.

In addition, the ECU 6 has a function of controlling the valve-open duration Tia of the first injector 28A and the valve-open duration Tib of the second injector 28B by sending PWM (pulse width modulation) signals to the first and second injectors 28A and 28B. That is, the ECU 6 controls the amounts (or flow rates) of hydrogen injected from the first and second injectors 28A and 28B by varying in the respective driving intervals the duty ratios of the PWM signals outputted to the first and second injectors 28A and 28B, so that the flow rate of hydrogen supplied to the anode flow path 12 and the anode pressure Pa can be controlled.

2. Functions of ECU 6

Further, the ECU 6 contains a configuration for calculating the amount of hydrogen required for the fuel-cell stack 10. The ECU 6 is constituted by a driving-interval setting unit 61, a power-consumption calculation unit 62, a target-pressure-variation calculation unit 63, an exhaust-gas-amount calculation unit 64, an assignment unit 65, a first valve-open-duration calculation unit 66, a first limit unit 67, a conversion unit 68, a second valve-open-duration calculation unit 69, and a second limit unit 70 as illustrated in FIG. 2.

The driving-interval setting unit 61 is configured to send periodic signals A and B to the assignment unit 65, where the periodic signal A provides a reference timing for the first injector 28A to start hydrogen injection (to open), and the periodic signal B provides a reference timing for the second injector 28B to start hydrogen injection (to open).

In addition, according to the present embodiment, the period of the periodic signal A is predetermined to be 200 milliseconds, and the period of the periodic signal B is predetermined to be 100 milliseconds. Therefore, the first driving intervals for the first injector 28A are 200 msec and the second driving intervals for the second injector 28B are 100 msec. That is, the second driving intervals for the second injector 28B are set shorter than the first driving intervals for the first injector 28A.

Figure 5:
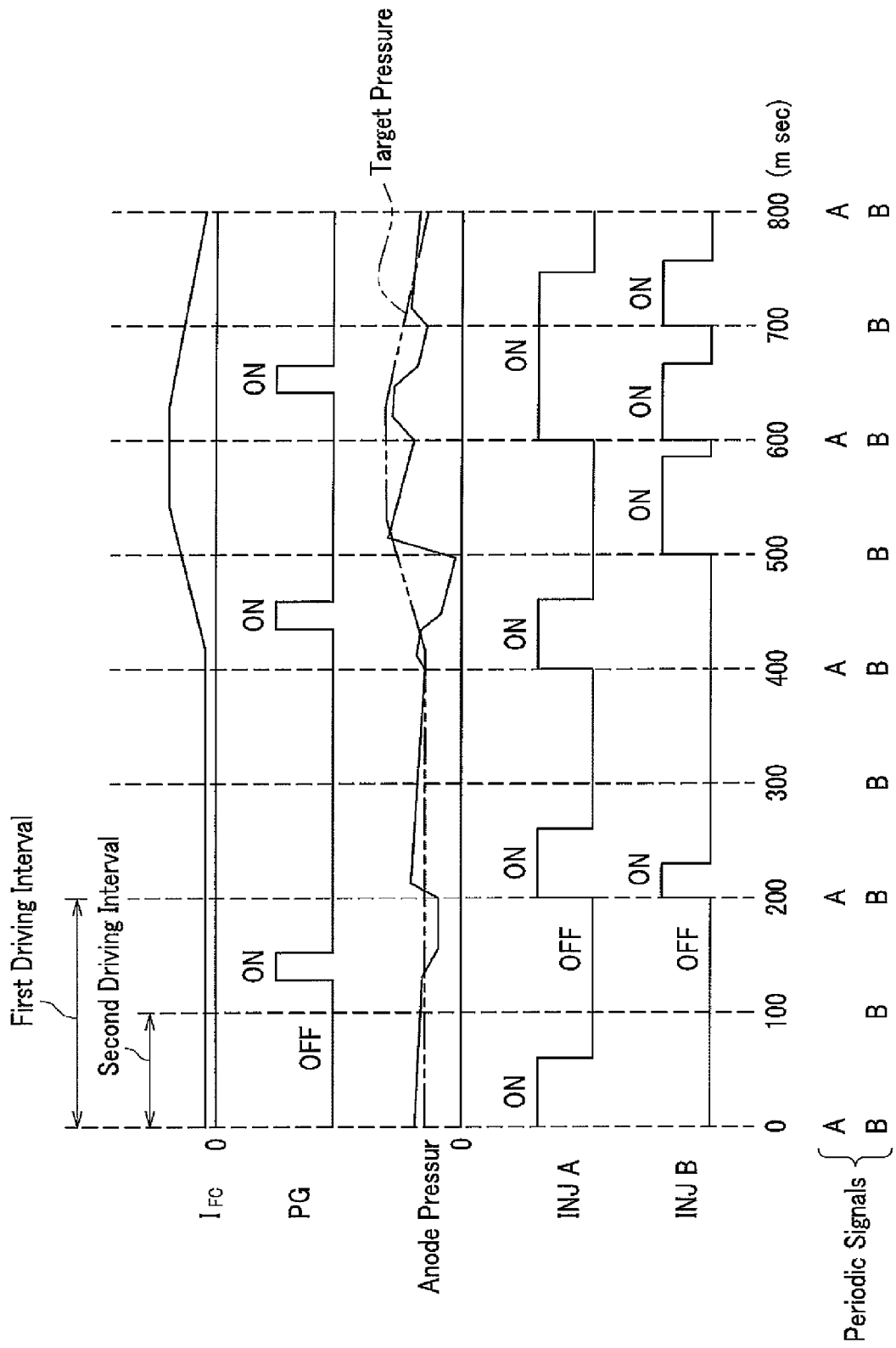
FIG. 5 is a timing diagram indicating examples of operations of first and second injectors in the fuel-cell vehicle according to the embodiment.

Further, since the period (200 msec) of the periodic signal A is twice the period (100 msec) of the periodic signal B according to the present embodiment, the start of every other second driving interval synchronizes with the start of one of the first driving intervals (as indicated in FIG. 5).

The power-consumption calculation unit 62 calculates the amount of hydrogen consumed for electric power generation in the fuel-cell stack 10, among the amounts of hydrogen required for the fuel-cell stack 10. The amount of hydrogen consumed for electric power generation in the fuel-cell stack 10 is hereinafter referred to as the "load-based hydrogen amount".

Specifically, the power-consumption calculation unit 62 is configured to calculate a value of the load-based hydrogen amount corresponding to a target amount of power generation of the fuel-cell stack 10 on the basis of the accelerator position θ detected by the accelerator position sensor 8, by reference to an accelerator position map (not shown), and transmit the value of the load-based hydrogen amount to the assignment unit 65.

The target-pressure-variation calculation unit 63 calculates the amount of hydrogen required for controlling the anode pressure Pa in the anode flow path 12 in the fuel-cell stack 10, among the amounts of hydrogen required for the fuel-cell stack 10. The amount of hydrogen required for controlling the anode pressure Pa in the anode flow path 12 is hereinafter referred to as the "pressure-control hydrogen amount".

Specifically, in order to calculate the pressure-control hydrogen amount, the power-consumption calculation unit 62 is configured to perform the following operations.

First, the target-pressure-variation calculation unit 63 calculates the target pressure of the anode flow path 12 on the basis of the current $I_{FC}$ outputted from the fuel-cell stack 10, by reference to a target pressure map indicating a relationship between the current $I_{FC}$ and the target pressure. In the relationship, the target pressure increases as the current $I_{FC}$ increases, while the target pressure decreases as the current $I_{FC}$ decreases (as indicated in FIG. 5).

Then, the target-pressure-variation calculation unit 63 calculates the amount of variation in the anode pressure Pa in the anode flow path 12 by comparing the target pressure calculated above with the previously calculated target pressure.

Subsequently, the target-pressure-variation calculation unit 63 transmits to the assignment unit 65 a hydrogen amount corresponding to the calculated amount of variation in the anode pressure Pa as the pressure-control hydrogen amount, so that the anode pressure Pa in the anode flow path 12 is adjusted to the target pressure.

In addition, the target-pressure-variation calculation unit 63 is configured to transmit to the first valve-open-duration calculation unit 66 data on the target pressure calculated by reference to the target pressure map.

Further, the target-pressure-variation calculation unit 63 may be configured to be capable of correcting the pressure-control hydrogen amount calculated as above, on the basis of the drainability of the anode system 2 or the degree of humidification of the electrolyte membrane.

The exhaust-gas-amount calculation unit 64 calculates the amount of hydrogen required for compensating for the hydrogen exhausted by opening the purge valve 33 (illustrated in FIG. 1), among the amounts of hydrogen required for the fuel-cell stack 10. The amount of hydrogen required for compensating for the hydrogen exhausted by opening the purge valve 33 is hereinafter referred to as the "exhausted hydrogen amount".

Specifically, the exhaust-gas-amount calculation unit 64 is configured to calculate the exhausted hydrogen amount on the basis of the valve-open duration of the purge valve 33 by reference to a map which is obtained in advance by experiment, and transmit the exhausted hydrogen amount to the assignment unit 65.

In addition, the exhaust-gas-amount calculation unit 64 is configured to correct the exhausted hydrogen amount which is to be transmitted to the assignment unit 65 such that the exhausted hydrogen amount is increased when the outputted current $I_{FC}$ is determined to be high.

The assignment unit 65 performs assignment processing for the required hydrogen amounts (that is, the load-based hydrogen amount, the pressure-control hydrogen amount, and the exhausted hydrogen amount) based on an assignment table (as illustrated in FIG. 3).

3. Assignment Processing

The assignment processing is processing for assigning to either of the first and second injectors 28A and 28B the operation of injecting each of the load-based hydrogen amount, the pressure-control hydrogen amount, and the exhausted hydrogen amount.

As illustrated in FIG. 3, the assignment table indicates the injector to which the injection of each of the load-based hydrogen amount, the pressure-control hydrogen amount, and the exhausted hydrogen amount is to be assigned, for each of the case where the assignment unit 65 receives both of the periodic signals A and B from the driving-interval setting unit 61 and the case where the assignment unit 65 receives only the periodic signal B.

Figure 4:
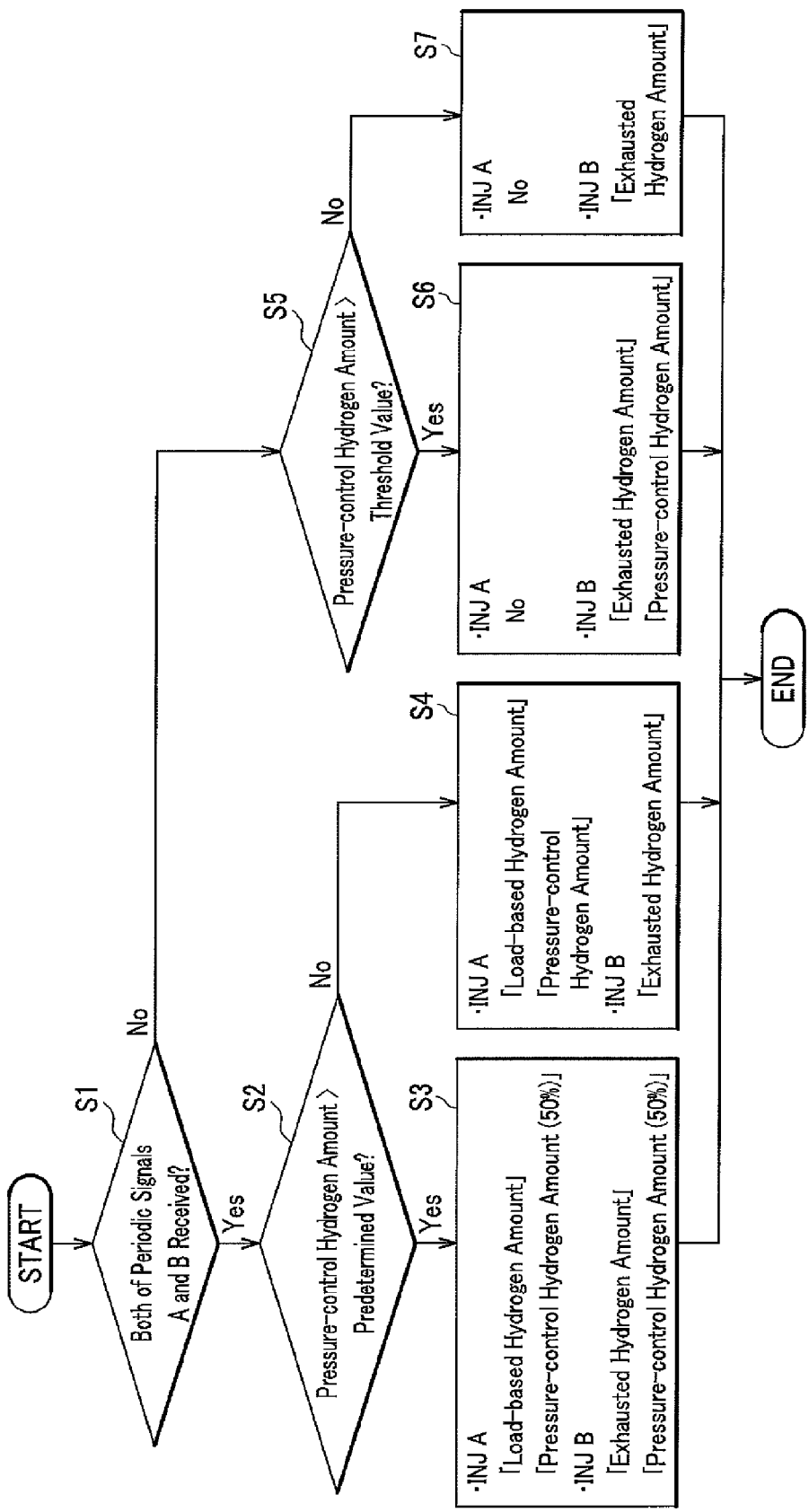
FIG. 4 is a flow diagram indicating assignment processing according to the embodiment.

In addition, as illustrated by the indication "START" in FIG. 4, the assignment unit 65 starts the assignment processing when the assignment unit 65 receives the periodic signal(s) from the driving-interval setting unit 61. Hereinbelow, the assignment processing will be explained with reference to mainly FIG. 4.

First, the assignment unit 65 determines whether or not both of the periodic signals A and B are received from the driving-interval setting unit 61 (in step S1). According to the determination of the received periodic signal(s), it is possible to determine both of the first and second injectors 28A and 28B or only the second injector 28B to be the injector(s) to be driven.

When it is determined that both of the periodic signals A and B are received from the driving-interval setting unit 61 (i.e., when Yes is determined in step S1), the assignment unit 65 determines whether or not the pressure-control hydrogen amount exceeds a predetermined value (in step S2) in order to determine assignment of the pressure-control hydrogen amount. The predetermined value is not specifically limited, and can be changed when necessary.

When the pressure-control hydrogen amount is determined to exceed the predetermined value (i.e., when Yes is determined in step S2), the assignment unit 65 assigns the load-based hydrogen amount and half (50%) of the pressure-control hydrogen amount to the first injector 28A, and assigns the exhausted hydrogen amount and the remaining half (50%) of the pressure-control hydrogen amount to the second injector 28B (in step S3).

Then, the assignment unit 65 transmits a first required hydrogen amount to the first valve-open-duration calculation unit 66, and a second required hydrogen amount to the second valve-open-duration calculation unit 69, where the first required hydrogen amount is the sum of the load-based hydrogen amount and half of the pressure-control hydrogen amount, and the second required hydrogen amount is the sum of the exhausted hydrogen amount and the remaining half of the pressure-control hydrogen amount. Thereafter, the assignment unit 65 completes the assignment processing (as indicated by "END").

On the other hand, when the pressure-control hydrogen amount is determined not to exceed the predetermined value (i.e., when No is determined in step S2), the assignment unit 65 assigns the load-based hydrogen amount and the pressure-control hydrogen amount to the first injector 28A, and assigns the exhausted hydrogen amount to the second injector 28B (in step S4).

Then, the assignment unit 65 transmits a third required hydrogen amount to the first valve-open-duration calculation unit 66, and the exhausted hydrogen amount to the second valve-open-duration calculation unit 69, where the third required hydrogen amount is the sum of the load-based hydrogen amount and the pressure-control hydrogen amount. Thereafter, the assignment unit 65 completes the assignment processing (as indicated by "END").

When it is determined that at least one of the periodic signals A and B is not received from the driving-interval setting unit 61 (i.e., when No is determined in step S1), the assignment unit 65 determines that the second injector 28B is to be driven. Then, in order to determine assignment of the pressure-control hydrogen amount, the assignment unit 65 determines whether or not the pressure-control hydrogen amount exceeds a threshold value (in step S5). The threshold value is a criterion for determining whether or not the hydrogen amount can cause stoichiometric insufficiency when the second injector 28B is not opened and hydrogen is not injected until the next one of the first driving intervals. The threshold value is determined in advance by experiment or the like.

When the pressure-control hydrogen amount is determined to exceed the threshold value (i.e., when Yes is determined in step S5), the assignment unit 65 assigns the pressure-control hydrogen amount and the exhausted hydrogen amount to the second injector 28B (in step S6). In addition, the assignment unit 65 does not allocate the load-based hydrogen amount to either of the first and second injectors 28A and 28B, and carries over the load-based hydrogen amount (in step S6). Then, the assignment unit 65 transmits to the second valve-open-duration calculation unit 69 the sum of the pressure-control hydrogen amount and the exhausted hydrogen amount as a required hydrogen amount. Thereafter, the assignment unit 65 completes the assignment processing (as indicated by "END").

On the other hand, when the pressure-control hydrogen amount is determined not to exceed the threshold value (i.e., when No is determined in step S5), the assignment unit 65 assigns only the exhausted hydrogen amount to the second injector 28B (in step S7). In addition, the assignment unit 65 does not allocate the load-based hydrogen amount and the pressure-control hydrogen amount to either of the first and second injectors 28A and 28B, and carries over the load-based hydrogen amount and the pressure-control hydrogen amount (in step S7). Then, the assignment unit 65 transmits to the second valve-open-duration calculation unit 69 a required hydrogen amount corresponding to the exhausted hydrogen amount. Thereafter, the assignment unit 65 completes the assignment processing (as indicated by "END").

In the assignment processing explained above, the load-based hydrogen amount is assigned in the first driving intervals for the first injector 28A (in step S3 or S4) when the assignment unit 65 receives both of the periodic signals A and B. Therefore, the load-based hydrogen amount, which is greater than the pressure-control hydrogen amount and the exhausted hydrogen amount as a whole, is preferentially assigned to the first injector 28A having high circulation efficiency. Thus, the amount of hydrogen which circulates in the fuel-cell system 1 is increased by the above assignment processing.

On the other hand, the exhausted hydrogen amount is assigned in the second driving intervals for the second injector 28B (in step S3, S4, S6, or S7) when the assignment unit 65 receives both of the periodic signals A and B or when the assignment unit 65 receives only the periodic signal B. Therefore, even when the purge valve 33 is opened during one of the first driving intervals for the first injector 28A, the exhausted hydrogen amount is supplied from the second injector 28B, so that the stoichiometric insufficiency in the fuel-cell stack 10 can be quickly resolved.

In particular, the assignment unit 65 is configured to allocate the exhausted hydrogen amount to the second injector 28B even when the assignment unit 65 receives both of the periodic signals A and B, i.e., even when the first injector 28A can be driven. Therefore, it is possible to reduce the number of operations of the first injector 28A, and therefore increase the lifetime of the first injector 28A.

Further, the pressure-control hydrogen amount is assigned in the second driving intervals for the second injector 28B (in step S3, S4, S6, or S7) when the assignment unit 65 receives both of the periodic signals A and B or when the assignment unit 65 receives only the periodic signal B. Therefore, even when the load on the fuel-cell stack 10 becomes high and the anode pressure Pa rapidly varies during one of the first drive intervals for the first injector 28A, the pressure-control hydrogen amount is supplied from the second injector 28B, so that the stoichiometric insufficiency in the fuel-cell stack 10 can be quickly resolved.

In the present embodiment, the pressure-control hydrogen amount is assigned to the second injector 28B when the assignment unit 65 receives only the periodic signal B (in step S6 or S7).

In contrast, the pressure-control hydrogen amount is assigned to the first injector A or both of the first and second injectors 28A and 28B when the assignment unit 65 receives both of the periodic signals A and B (in step S3 or S4). Since the first injector 28A has a greater circulation capacity than the second injector 28B, the preferential assignment of the required hydrogen amounts to the first injector 28A increases the power generation efficiency and enhances drainage of the generated water.

Referring back to FIG. 2, the configuration of the ECU 6 will be further explained below.

The first valve-open-duration calculation unit 66 calculates the valve-open duration Tia of the first injector 28A corresponding to each of the required hydrogen amounts outputted from the assignment unit 65, by reference to a map indicating a relationship between the required hydrogen amount and the valve-open duration Tia.

In addition, the first valve-open-duration calculation unit 66 is configured to include a feedback value in the valve-open duration Tia of the first injector 28A in order to correct the difference in the injected amount between the target value and the measured value in the previous one of the first driving intervals for the first injector 28A. The first valve-open-duration calculation unit 66 is also configured to determine the feedback value by calculating the difference between the downstream pressure $P_{29}$ (as the measured value) detected by the downstream pressure sensor 29 (illustrated in FIG. 1) and the target pressure of the anode pressure Pa in the anode flow path 12 transmitted from the target-pressure-variation calculation unit 63.

Further, the first valve-open-duration calculation unit 66 has an ineffective injection time map, which indicates a relationship between the ineffective injection time of the first injector 28A and the combination of the pressure and the temperature of the hydrogen on the upstream side of the first injector 28A.

Furthermore, the first valve-open-duration calculation unit 66 is configured to calculate the ineffective injection time of the first injector 28A on the basis of the upstream temperature $T_{26}$ and the upstream pressure $P_{27}$ measured by the temperature sensor 26 and the upstream pressure sensor 27, by reference to the ineffective injection time map, and include the calculated ineffective injection time in the valve-open duration Tia.

The first limit unit 67 determines whether or not the valve-open duration Tia transmitted from the first valve-open-duration calculation unit 66 exceeds a limit value (that is, an upper limit of the time in which the PWM control is possible) of the first injector 28A, and limits the valve-open duration Tia to the upper-limit time.

Specifically, the first limit unit 67 is configured to generate a PWM signal having a duty ratio corresponding to the upper-limit time when the valve-open duration Tia exceeds the upper-limit time, and generate a PWM signal having a duty ratio corresponding to the valve-open duration Tia when the valve-open duration Tia does not exceed the upper-limit time, and send the PWM signal to the first injector 28A.

In addition, the first limit unit 67 is configured to transmit to the conversion unit 68 an additional valve-open duration corresponding to the excess over the upper-limit time in the valve-open duration Tia when the valve-open duration Tia exceeds the upper-limit time.

The conversion unit 68 converts the additional valve-open duration (which corresponds to the excess over the upper-limit time in the valve-open duration Tia for the first injector 28A and is transmitted from the first limit unit 67) into a valve-open duration for the second injector 28B by reference to a conversion map. The conversion is made as above because the ejector 30 is arranged on the downstream side of the first injector 28A and therefore the amount of hydrogen supplied from the second injector 28B to the anode flow path 12 becomes greater than the amount of hydrogen supplied from the first injector 28A to the anode flow path 12. Thus, part of the valve-open duration assigned to the first injector 28A can be reassigned to the second injector 28B by making the conversion by the conversion unit 68 and controlling the valve-open durations as above.

The configuration including the conversion unit 68, the first valve-open-duration calculation unit 66, and the first limit unit 67 corresponds to the "first fuel-supply-device control unit" described in the SUMMARY OF THE INVENTION.

The second valve-open-duration calculation unit 69 is configured to calculate the valve-open duration Tib of the second injector 28B corresponding to the required hydrogen amount assigned to the second injector 28B by reference to a required-hydrogen-amount map, and transmit the valve-open duration Tib to the second limit unit 70.

The second limit unit 70 is configured to determine whether or not a total valve-open duration as the sum of the valve-open duration Tib (transmitted from the second valve-open-duration calculation unit 69) and the additional valve-open duration (converted by and transmitted from the conversion unit 68) exceeds a limit value (upper-limit time) of the second injector 28B.

Specifically, the second limit unit 70 is configured to generate a PWM signal having a duty ratio corresponding to the upper-limit time when the total valve-open duration Tib exceeds the upper-limit time, and generate a PWM signal having a duty ratio corresponding to the total valve-open duration Tib when the total valve-open duration Tib does not exceed the upper-limit time, and send the PWM signal to the second injector 28B.

The configuration including the second valve-open-duration calculation unit 69 and the second limit unit 70 corresponds to the "second fuel-supply-device control unit" described in the SUMMARY OF THE INVENTION.

4. Exemplary Operations

Next, exemplary operations, in a period (of 0 to 800 msec), of the first and second injectors 28A and 28B in the fuel-cell vehicle according to the present embodiment will be explained with reference to mainly FIG. 5. In FIG. 5, the multiple dashed lines extending in the vertical direction indicate the boundaries between intervals of 100 msec, and time progresses from left to right in the timing diagram. In the following explanations, it is assumed that in the period indicated in FIG. 5, the periodic signal A is sent from the driving-interval setting unit 61 to the assignment unit 65 at the times of 0, 200, 400, 600, and 800 msec, and the periodic signal B is sent from the driving-interval setting unit 61 to the assignment unit 65 at the times of 0, 100, 200, 300, 400, 500, 600, 700, and 800 msec.

In the example of the period (from 0 to 800 msec) indicated in FIG. 5, the level of the current $I_{FC}$ outputted from the fuel-cell stack 10 is approximately constant (or low) in the interval from 0 to 400 msec, increases in the interval from 400 to 550 msec (or during acceleration), is approximately constant (or high) in the interval from 550 to 650 msec, and decreases in the interval from 650 to 800 msec (or during deceleration).

The purge valve 33, denoted by PG, opens at the times of 150, 450, and 650 msec, and the anode pressure Pa in the anode flow path 12 varies (that is, increases or decreases) in correspondence with the current $I_{FC}$ as a whole except for the interval around the time of 500 msec.

Hereinbelow, the operations will be explained for each of the intervals of 100 msec.

<At the Time of 100 msec>

As illustrated in FIG. 5, since the purge valve 33 is closed in the interval from 0 to 100 msec, the exhausted hydrogen amount calculated by the exhaust-gas-amount calculation unit 64 is zero.

In addition, the difference between the anode pressure Pa and the target pressure is small, and the pressure-control hydrogen amount calculated by the target-pressure-variation calculation unit 63 is also small. Therefore, in the assignment processing performed at the time of 100 msec, the pressure-control hydrogen amount is determined to be smaller than the threshold value (i.e., no is determined in step S5 in the flow of FIG. 4). Thus, only the exhausted hydrogen amount is assigned to the second injector 28B (i.e., the operations in step S7 in the flow of FIG. 4 are performed). However, as indicated in FIG. 5, the second injector 28B is not opened at the time of 100 msec since the exhausted hydrogen amount is zero.

<At the Time of 200 msec>

Since the purge valve 33 is opened during the interval of 100 to 200 msec, the exhaust-gas-amount calculation unit 64 calculates the exhausted hydrogen amount.

On the other hand, the difference between the anode pressure Pa and the target pressure is small, and the pressure-control hydrogen amount calculated by the target-pressure-variation calculation unit 63 is also small. Therefore, in the assignment processing performed at the time of 200 msec, the pressure-control hydrogen amount is determined to be smaller than the predetermined value (i.e., No is determined in step S2 in the flow of FIG. 4).

As a result, the load-based hydrogen amount and the pressure-control hydrogen amount are assigned to the first injector 28A, and the exhausted hydrogen amount is assigned to the second injector 28B (i.e., the operations in step S4 in the flow of FIG. 4 are performed).

Thus, at the time of 200 msec, the first injector 28A is opened and an amount of hydrogen corresponding to the sum of the load-based hydrogen amount and the pressure-control hydrogen amount is supplied to the anode flow path 12. In addition, the second injector 28B is also opened and an amount of hydrogen corresponding to the exhausted hydrogen amount is supplied to the anode flow path 12.

<At the Time of 300 msec>

In the interval of 200 to 300 msec, the purge valve 33 is closed. In addition, the difference between the anode pressure Pa and the target pressure is small, and the pressure-control hydrogen amount calculated by the target-pressure-variation calculation unit 63 is also small. Therefore, in the assignment processing performed at the time of 300 msec, the pressure-control hydrogen amount is determined to be smaller than the predetermined value (i.e., No is determined in step S5 in the flow of FIG. 4), and only the exhausted hydrogen amount is assigned to the second injector 28B (i.e., the operations in step S7 in the flow of FIG. 4 are performed). However, the second injector 28B is not opened at the time of 300 msec since the exhausted hydrogen amount is zero.

<At the Time of 400 msec>

The purge valve 33 is closed in the interval of 300 to 400 msec. In addition, the difference between the anode pressure Pa and the target pressure is small, and the pressure-control hydrogen amount calculated by the target-pressure-variation calculation unit 63 is also small. Therefore, in the assignment processing performed at the time of 400 msec, the pressure-control hydrogen amount is determined to be smaller than the predetermined value (i.e., No is determined in step S2 in the flow of FIG. 4).

As a result, the load-based hydrogen amount and the pressure-control hydrogen amount are assigned to the first injector 28A, and the exhausted hydrogen amount is assigned to the second injector 28B (i.e., the operations in step S4 in the flow of FIG. 4 are performed).

Thus, at the time of 400 msec, the first injector 28A is opened and an amount of hydrogen corresponding to the sum of the load-based hydrogen amount and the pressure-control hydrogen amount is supplied to the anode flow path 12. On the other hand, the second injector 28B is not opened at the time of 400 msec since the exhausted hydrogen amount is zero.

<At the Time of 500 msec>

In the interval of 400 to 500 msec (or during the acceleration), the current $I_{FC}$ outputted from the fuel-cell stack 10 increases, and the purge valve 33 is opened. Therefore, the anode pressure Pa rapidly varies (or rapidly falls), so that the difference between the anode pressure Pa and the target pressure is increased. As a result, in the assignment processing performed at the time of 500 msec, the pressure-control hydrogen amount is determined to exceed the predetermined value (i.e., Yes is determined in step S5 in the flow of FIG. 4), and the pressure-control hydrogen amount and the exhausted hydrogen amount are assigned to the second injector 28B (i.e., the operations in step S6 in the flow of FIG. 4 are performed). Thus, the second injector 28B is opened, so that an amount of hydrogen corresponding to the sum of the pressure-control hydrogen amount and the exhausted hydrogen amount is supplied to the anode flow path 12.

<At the Time of 600 msec>

The purge valve 33 is closed during the interval of 500 to 600 msec. In addition, since the difference between the anode pressure Pa and the target pressure is reduced by the hydrogen injection from the second injector 28B at the time of 500 msec, the pressure-control hydrogen amount calculated by the target-pressure-variation calculation unit 63 is small. Therefore, in the assignment processing performed at the time of 600 msec, the pressure-control hydrogen amount is determined to be smaller than the predetermined value (i.e., No is determined in step S2 in the flow of FIG. 4).

As a result, the load-based hydrogen amount and the pressure-control hydrogen amount are assigned to the first injector 28A, and the exhausted hydrogen amount is assigned to the second injector 28B (i.e., the operations in step S4 in the flow of FIG. 4 are performed).

However, as indicated in the graph of the current $I_{FC}$, acceleration is performed in the interval of 400 to 500 msec, and the output level of the current $I_{FC}$ is high in the interval of 500 to 600 msec. Therefore, the pressure-control hydrogen amount, which is calculated by the power-consumption calculation unit 62 and assigned to the first injector 28A, becomes large, and the valve-open duration Tia of the first injector 28A exceeds the limit value (upper-limit time) which is set by the first limit unit 67.

Thus, the excess over the upper-limit time in the valve-open duration Tia is transmitted from the first limit unit 67 to the conversion unit 68, the excess is converted by the conversion unit 68, and the converted excess is transferred to the second limit unit 70.

As a result, at the time of 600 msec, the first injector 28A is opened for the duration corresponding to the upper-limit time, and the second injector 28B is opened for the converted valve-open duration transmitted from the conversion unit 68 although the exhausted hydrogen amount is zero. Accordingly, hydrogen is supplied from both of the first and second injectors 28A and 28B to the anode flow path 12.

<At the Time of 700 msec>

Since the purge valve 33 is opened during the interval of 600 to 700 msec, the exhaust-gas-amount calculation unit 64 calculates the exhausted hydrogen amount.

On the other hand, the difference between the anode pressure Pa and the target pressure is small, and the pressure-control hydrogen amount calculated by the target-pressure-variation calculation unit 63 is also small. Therefore, in the assignment processing performed at the time of 700 msec, the pressure-control hydrogen amount is determined to be smaller than the threshold value (i.e., No is determined in step S5 in the flow of FIG. 4). As a result, at the time of 700 msec, only the exhausted hydrogen amount is assigned to the second injector 28B, so that the second injector 28B is opened.

In addition, since the output level of the current $I_{FC}$ is high in the interval of 600 to 700 msec, the exhaust-gas-amount calculation unit 64 corrects the exhausted hydrogen amount to be increased compared with an interval when the output level of the current $I_{FC}$ is low. Therefore, the valve-open duration Tib of the second injector 28B at the time of 700 msec is longer than the valve-open duration Tib when the output level of the current $I_{FC}$ is low (as at the time of 200 msec).

5. Advantages of Embodiment

In the fuel-cell system 1 according to the embodiment explained above, the second intervals are set shorter than the first intervals by the driving-interval setting unit 61. Therefore, even when the load on the fuel-cell stack 10 becomes high and the anode pressure Pa rapidly varies during one of the driving intervals for the first injector 28A, for example, as in the interval of 400 to 500 msec indicated in FIG. 5, it is possible to supply hydrogen to the anode flow path 12 in the fuel-cell stack 10 and control the anode pressure Pa in the anode flow path 12 by opening the second injector 28B at the time of 500 msec without waiting for the next one of the first driving intervals which starts at the time of 600 msec.

That is, the fuel-cell system 1 having the driving-interval setting unit 61 enables quick pressure control in response to a rapid pressure variation and therefore reduces the possibility of occurrence of stoichiometric insufficiency.

In addition, in the fuel-cell system 1 according to the explained embodiment, even when the anode pressure Pa rapidly varies (rapidly falls) by opening of the purge valve 33, which is irregularly performed, the anode pressure Pa can be controlled by opening the second injector 28B, which can be opened at relatively short intervals. Therefore, it is possible to avoid the stoichiometric insufficiency and stabilize the power generation.

Further, in the fuel-cell system 1 according to the explained embodiment, the load-based hydrogen amount is assigned to the first injector 28A, so that a greater amount of hydrogen circulates through the ejector 30. Therefore, it is possible to improve the power generation efficiency of the fuel-cell stack 10 and enable drainage of the water which is generated in the fuel-cell stack 10 and remains in the anode system 2.

6. Variation of Embodiment

Next, a variation of the ECU 6 according to the explained embodiment will be explained below.

Figure 6:
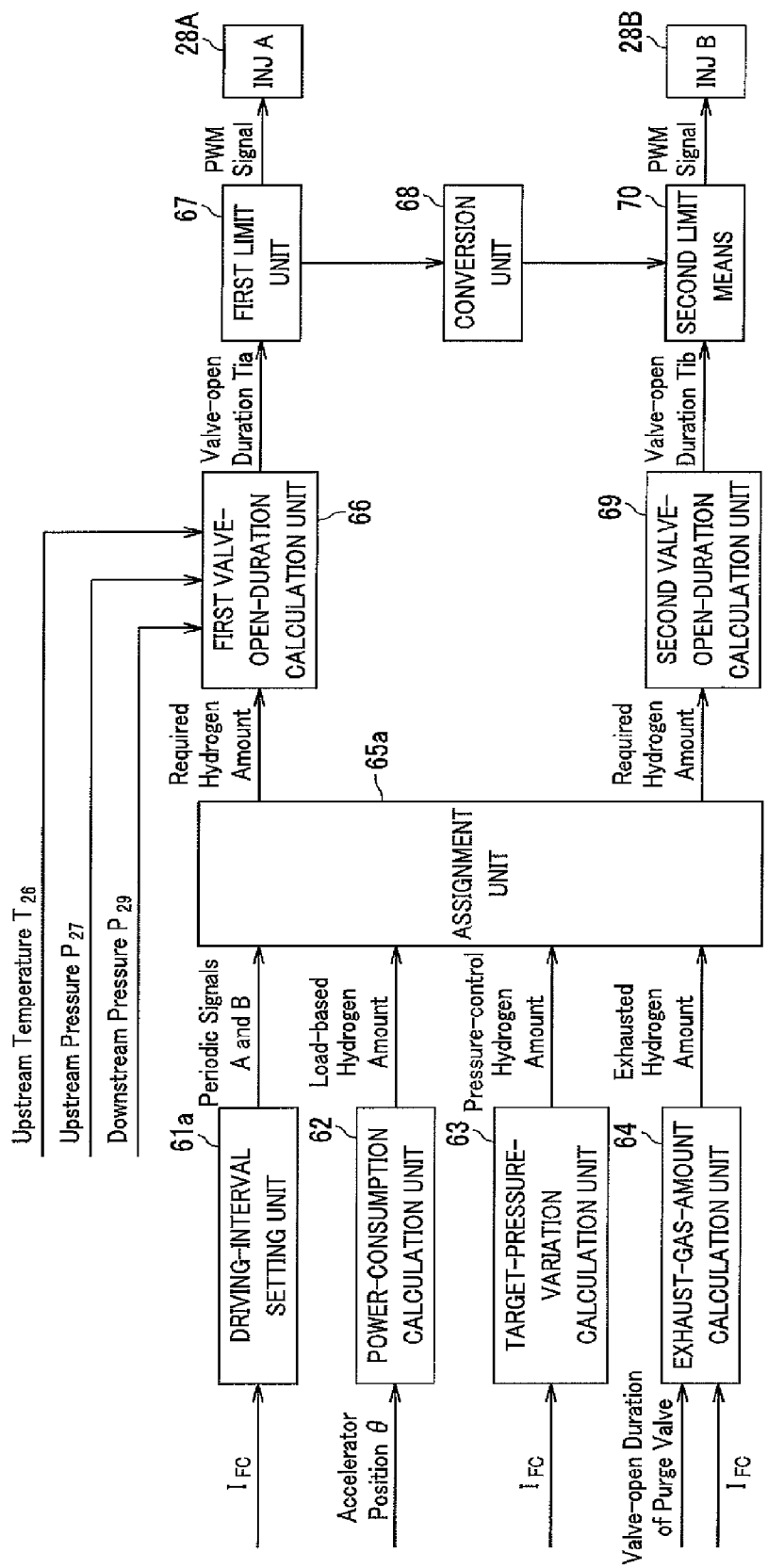
FIG. 6 is a block diagram presented for explaining details of control functions of a control device according to a variation of the embodiment.

As illustrated in FIG. 6, the ECU 6a as the variation is constituted by a driving-interval setting unit 61a, the power-consumption calculation unit 62, the target-pressure-variation calculation unit 63, the exhaust-gas-amount calculation unit 64, an assignment unit 65a, the first valve-open-duration calculation unit 66, the first limit unit 67, the conversion unit 68, the second valve-open-duration calculation unit 69, and the second limit unit 70.

The ECU 6a as the variation is different from the ECU 6 according to the explained embodiment in that the driving-interval setting unit 61 and the assignment unit 65 in the ECU 6 are respectively replaced with the driving-interval setting unit 61a and assignment unit 65a in the ECU 6a.

Like the driving-interval setting unit 61, the driving-interval setting unit 61a is configured to send periodic signals A and B to the assignment unit 65a, where the periodic signal A provides a reference timing for the first injector 28A to start hydrogen injection (to open), and the periodic signal B provides a reference timing for the second injector 28B to start hydrogen injection (to open).

Figure 7:
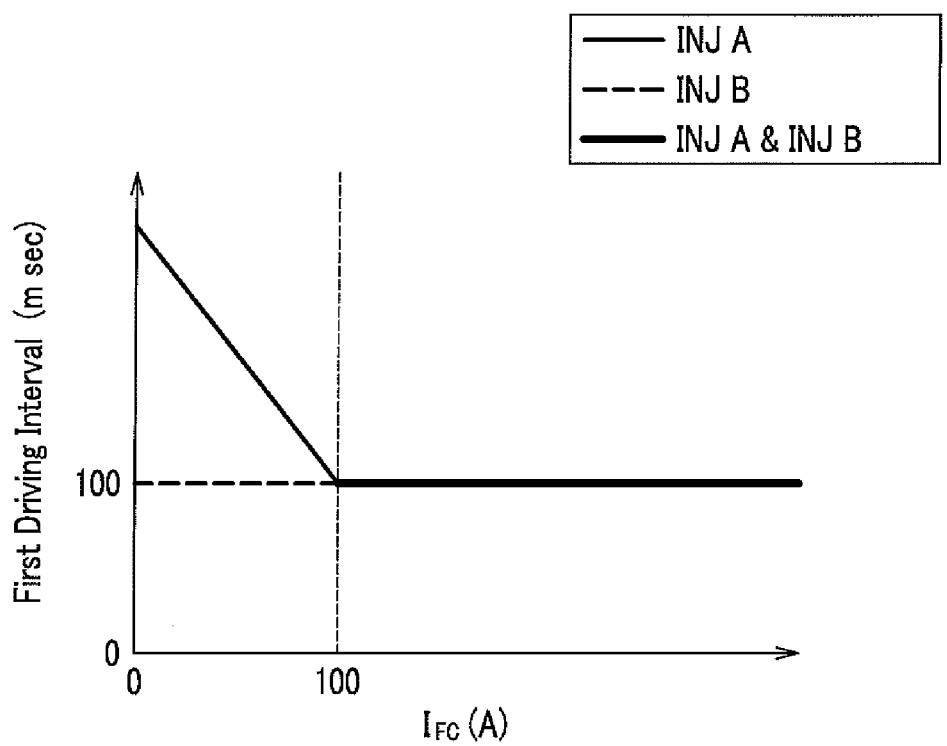
FIG. 7 is a diagram indicating a relationship between the first driving intervals which are set by a driving-interval setting unit and the current of a fuel-cell stack according to the variation.

On the other hand, as illustrated in FIG. 7, the driving-interval setting unit 61a in the variation is different from the driving-interval setting unit 61 in the explained embodiment in that the period of the periodic signal A varies with the output level (of the current $I_{FC}$) of the fuel-cell stack 10.

Specifically, the driving-interval setting unit 61a is configured as follows.

The period of the periodic signal B is set constant to 100 msec. The period of the periodic signal A is set to 100 msec, which is identical to the period of the periodic signal B, when the current $I_{FC}$ is 100 A or more. Further, the period of the periodic signal A is set to gradually increase with decrease in the current $I_{FC}$ (i.e., with decrease in the load imposed on the fuel-cell stack 10) when the current $I_{FC}$ is below 100 A. That is, the driving-interval setting unit 61a in the variation is configured such that the second driving intervals are set shorter than the first driving intervals only when the load on the fuel-cell stack 10 is low. Therefore, in the driving-interval setting unit 61a in the variation, the periodic signal B does not necessarily synchronize with the periodic signal A, since the periods of the first driving intervals vary.

Like the assignment unit 65 in the explained embodiment, the assignment unit 65a receives the periodic signals from the driving-interval setting unit 61a, and performs assignment of the required hydrogen amounts (the load-based hydrogen amount, the pressure-control hydrogen amount, and the exhausted hydrogen amount) based on an assignment table (as illustrated in FIG. 8). As mentioned before, in the driving-interval setting unit 61a in the variation, the periodic signal B does not necessarily synchronize with the periodic signal A.

Therefore, as illustrated in FIG. 8, the assignment table for the assignment unit 65a in the variation indicates the injector to which the injection of each of the load-based hydrogen amount, the pressure-control hydrogen amount, and the exhausted hydrogen amount is to be assigned, such that the assignment unit 65a can perform the assignment in each of the case where the assignment unit 65a receives the periodic signal A from the driving-interval setting unit 61a and the case where the assignment unit 65a receives the periodic signal B from the driving-interval setting unit 61a. Details of the assignment table in the variation are explained below.

As indicated in FIG. 8, the assignment table indicates that the assignment unit 65a should allocate the load-based hydrogen amount to the first injector 28A when the periodic signal A is received. According to this indication, the load-based hydrogen amount is preferentially assigned to the first injector 28A having high circulation efficiency, so that a greater amount of hydrogen circulates in the fuel-cell system 1.

In addition, in the variation, when the load on the fuel-cell stack 10 is low, the intervals between injections from the first injector 28A are decreased with the periods of the first driving intervals, so that hydrogen can be supplied whenever necessary. Therefore, it is possible to decrease the possibility of occurrence of stoichiometric insufficiency.

As indicated in FIG. 8, the assignment table indicates that the assignment unit 65a should allocate the exhausted hydrogen amount to the second injector 28B when the periodic signal B is received. Therefore, even when the purge valve 33 is opened during one of the first intervals while the load on the fuel-cell stack 10 is low and the second driving intervals are set shorter than the first driving intervals, the exhausted hydrogen amount can be supplied from the second injector 28B, and therefore stoichiometric insufficiency which may occur in the fuel-cell stack 10 can be quickly resolved.

In addition, the assignment table of FIG. 8 indicates that the assignment unit 65a should allocate the pressure-control hydrogen amount to the second injector 28B on receipt of the periodic signal B only when the pressure-control hydrogen amount is equal to or greater than a threshold value.

Therefore, even when the anode pressure Pa rapidly varies during one of the first intervals while the load on the fuel-cell stack 10 is low and the second driving intervals are set shorter than the first driving intervals, the pressure-control hydrogen amount can be supplied from the second injector 28B, and therefore stoichiometric insufficiency which may occur in the fuel-cell stack 10 can be quickly resolved.

On the other hand, the assignment table of FIG. 8 indicates that the assignment unit 65a should allocate the pressure-control hydrogen amount to the first injector 28A on receipt of the periodic signal A in the case where the pressure-control hydrogen amount is below the threshold value and therefore stoichiometric insufficiency does not occur even without hydrogen supply from the second injector 28B.

As explained above, since the first injector 28A, which has a great circulation capacity, preferentially supplies hydrogen, it is possible to promote drainage of the water remaining in the anode system 2.

Further, in the fuel-cell system containing the ECU 6a as the variation, the second driving intervals are set shorter than the first driving intervals when the load on the fuel-cell stack 10 is low, for example, when the current $I_{FC}$ of the fuel-cell stack 10 is below 100 A. Therefore, even when the anode pressure Pa rapidly varies during one of the first intervals, it is possible to supply hydrogen by opening the second injector 28B, control the anode pressure Pa in the anode flow path 12 in the fuel-cell stack 10, and reduce the possibility of occurrence of stoichiometric insufficiency, without waiting for the next one of the first driving intervals.

Furthermore, in the fuel-cell system containing the ECU 6a as the variation, the periods of the first driving intervals are set to gradually decrease with increase in the load on the fuel-cell stack 10, and become equal to the period of the second driving intervals when the current $I_{FC}$ of the fuel-cell stack 10 is 100 A or more, i.e., when the load on the fuel-cell stack 10 is high. Therefore, the intervals between injections from the first injector 28A is shortened as the load on the fuel-cell stack 10 increases, i.e., as the required hydrogen amount increases. Thus, a necessary amount of hydrogen can be relatively quickly supplied to the fuel-cell stack 10, and the lifetime of the fuel-cell stack 10 can be increased.

7. Further Variations

Although the fuel-cell system 1 according to the embodiment and the ECU 6a in the variation of the embodiment are explained above, the present invention is not limited to the explained embodiment and the variation.

For example, the driving-interval setting unit 61 according to the explained embodiment is configured such that the period of the periodic signal A is predetermined to be 200 msec, the period of the periodic signal B is predetermined to be 100 msec, and therefore the timing of the start of each of the first driving intervals synchronizes with the timing of the start of one of the second driving intervals. However, the present invention is not limited to such a configuration. For example, the driving-interval setting unit 61 may be configured such that the period of the periodic signal A is predetermined to be 190 msec, the period of the periodic signal B is predetermined to be 90 msec, and therefore the timing of the start of each of the first driving intervals does not synchronize with the timing of the start of any of the second driving intervals. In the case where the driving-interval setting unit 61 is configured as above, the assignment unit 65 should allocate the required hydrogen amounts in accordance with the assignment table of FIG. 8, instead of FIG. 3.

In addition, although an example in which the fuel-cell system contains the two injectors (the first and second injectors 28A and 28B) is used in the explained embodiment and the variation of the embodiment, the present invention is not limited to the explained embodiment and the variation. It is sufficient for the fuel-cell system according to the present invention to have at least two fuel supply devices. That is, the fuel-cell system according to the present invention may have three or more fuel supply devices.

In addition, although, in the explained embodiment and the variation of the embodiment, the downstream portion of the bypass piping 32 (in which the second injector 28B is arranged) joins the hydrogen-supply piping 22 on the downstream side of the ejector 30, the present invention is not limited to such arrangement. For example, the downstream portion of the bypass piping 32 (in which the second injector 28B is arranged) may join the hydrogen-supply piping 22 on the upstream side of the ejector 30. According to this arrangement, the circulation efficiency of the hydrogen injected from the second injector 28B can be further increased, and occurrence of stoichiometric insufficiency can be further suppressed.

What is claimed is:

1. A fuel-cell system comprising:
    a fuel cell which is supplied with a fuel gas and an oxidant gas to generate electric power;
    fuel-gas supply piping which connects the fuel cell and a fuel tank;
    fuel-off-gas exhaust piping into which a fuel off-gas exhausted from the fuel cell flows;
    fuel-gas circulation piping which connects the fuel-off-gas exhaust piping and the fuel-gas supply piping;
    a first injector which is arranged in the fuel-gas supply piping on an upstream side of a connection between the fuel-gas supply piping and the fuel-gas circulation piping;
    bypass piping which branches off from the fuel-gas supply piping, forms a bypass of the first injector and the connection, and joins the fuel-gas supply piping;
    a second injector arranged in the bypass piping; and
    a control device which controls driving of the first injector and the second injector, and is programmed at least to
    set first driving intervals for the first injector and second driving intervals for the second injector,
    set valve-open durations of the first injector according to the first driving intervals, and
    set valve-open durations of the second injector according to the second driving intervals,
    wherein the second driving intervals are set to be shorter than the first driving intervals.

2. The fuel-cell system according to claim 1, further comprising
    an exhaust valve in the fuel-off-gas exhaust piping,
    wherein the control device is programmed to calculate an amount of the exhausted fuel off-gas on the basis of a valve-open duration of the exhaust valve, and set the valve-open durations of the second injector on the basis of the amount of the exhausted fuel off-gas.

3. The fuel-cell system according to claim 1, further comprising
    a circulation device in the connection between the fuel-gas supply piping and the fuel-gas circulation piping,
    wherein the control device is programmed to preferentially assign to the first injector, a load-based hydrogen amount of the fuel gas corresponding to a load on the fuel cell, and assign to the second injector, an excess of the load-based hydrogen amount over a capacity of the first injector.

4. The fuel-cell system according to claim 1, wherein the control device is programmed to set the first driving intervals such as to be gradually lengthened as a load imposed on the fuel cell decreases.

5. The fuel-cell system according to claim 1, wherein the second injector is operated in a second driving interval while the first injector is stopped in a first driving interval when a pressure-control hydrogen amount for an anode of the fuel cell is over a threshold value.

* * * * *